METEOROLOGICAL TRANSMITTER AND RECORDER

Filed April 19, 1954 8 Sheets-Sheet 1

Inventor
O. F. Nilsson
By Glascock Downing & Seebold
Attys.

April 9, 1957 O. F. NILSSON 2,788,254

METEOROLOGICAL TRANSMITTER AND RECORDER

Filed April 19, 1954 8 Sheets-Sheet 2

Inventor
O. F. Nilsson
By Glascock Downing & Seebold
Attys.

April 9, 1957 O. F. NILSSON 2,788,254

METEOROLOGICAL TRANSMITTER AND RECORDER

Filed April 19, 1954 8 Sheets-Sheet 3

Inventor
O. F. Nilsson
By Glascock Downing & Seebold
Attys.

April 9, 1957 O. F. NILSSON 2,788,254

METEOROLOGICAL TRANSMITTER AND RECORDER

Filed April 19, 1954 8 Sheets-Sheet 4

Inventor
O. F. Nilsson
By Glascock Downing & Seebold
Attys.

METEOROLOGICAL TRANSMITTER AND RECORDER

Filed April 19, 1954 8 Sheets-Sheet 5

Inventor
O. F. Nilsson
By Glascock Downing & Seebold
Attys.

METEOROLOGICAL TRANSMITTER AND RECORDER

Filed April 19, 1954 8 Sheets-Sheet 6

Inventor
O. F. Nilsson
By Glascock Downing & Seebold
Attys.

METEOROLOGICAL TRANSMITTER AND RECORDER

Filed April 19, 1954 8 Sheets-Sheet 7

Inventor
O. F. Nilsson
By Glascock Downing Seebold
Attys.

Fig.9
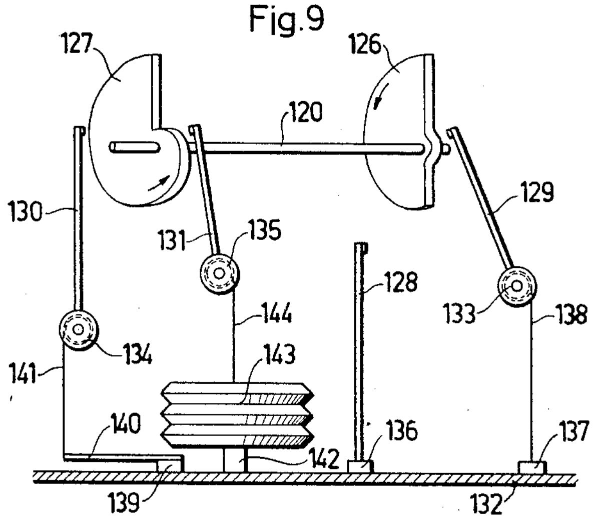
Fig.10
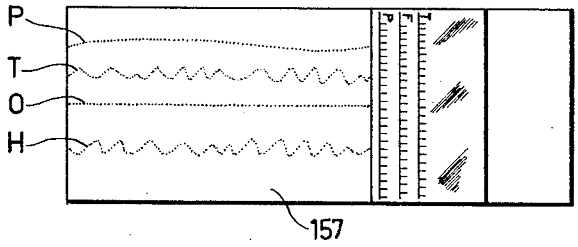
Fig.11 Fig.12
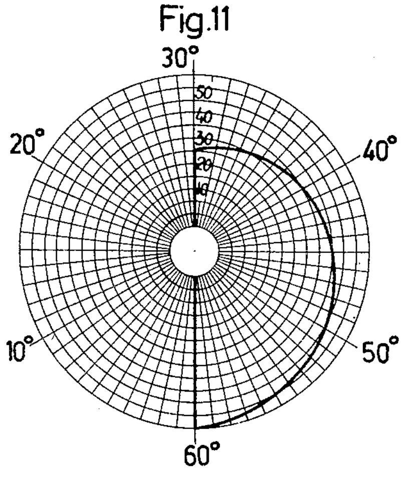
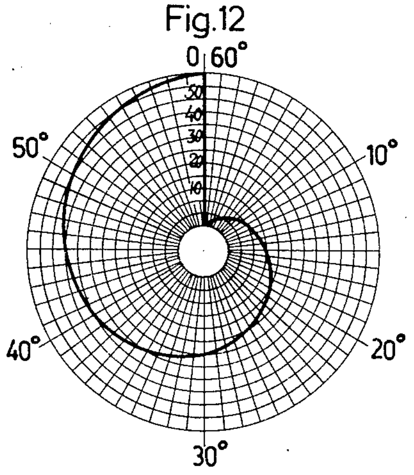
Inventor
O. F. Nilsson
By Glascock Downing Seebold
Attys.

1

2,788,254

METEOROLOGICAL TRANSMITTER AND RECORDER

Olof Fabian Nilsson, Stockholm, Sweden

Application April 19, 1954, Serial No. 424,231
15 Claims. (Cl. 346—33)

This invention relates to a system for transmitting the values of a measuring operation to a utilization circuit or recorder, more particularly a meteorological sonde for transmitting meteorological data to a meteorograph.

The subject of the invention is to create an improved apparatus of the type mentioned above which is reliable in function and allows a continuous automatic utilization or registration of the deflection of the indicating elements of even common measuring instruments, such as bimetallic thermometers, hair hygrometers or aneroid barometers.

A feature of the invention refers to the provision of a continuously rotatable shaft which is adapted to operate an electrical time base contact for producing one reference pulse for each cycle of operation of said shaft, preferably each revolution of said shaft, and which shaft supports at least one electrical contact segment having a circumference shaped as a plane spiral orientated at right angles to said shaft and mounted for being contacted by the movable indicating contact element of the associated measuring instrument at different points according to the position (deflection) of said element for producing an indicating pulse, means being provided for transferring said reference pulse and said indicating pulse to said recorder for producing a registration on the same.

Another object of the invention is to secure a straight reference line on the record by providing a joint control of the rotation of said contact segment and the movement of the recording element proper, for maintaining synchronism of said rotation and said movement.

Further objects and features of the invention will appear from the following detailed specification when read in conjunction with the accompanying drawings illustrating by way of example two embodiments applied to a meteorological sonde in connection with a meteorograph.

In the drawings:

Fig. 9 is a diagrammatic view illustrating some mechanical features of the sonde according to said second embodiment;

2

Fig. 10 is a plan of the record produced in the recorder or meteorograph;

Figs. 11 and 12 illustrate the design of two different contact segments according to the invention.

Figure 1:
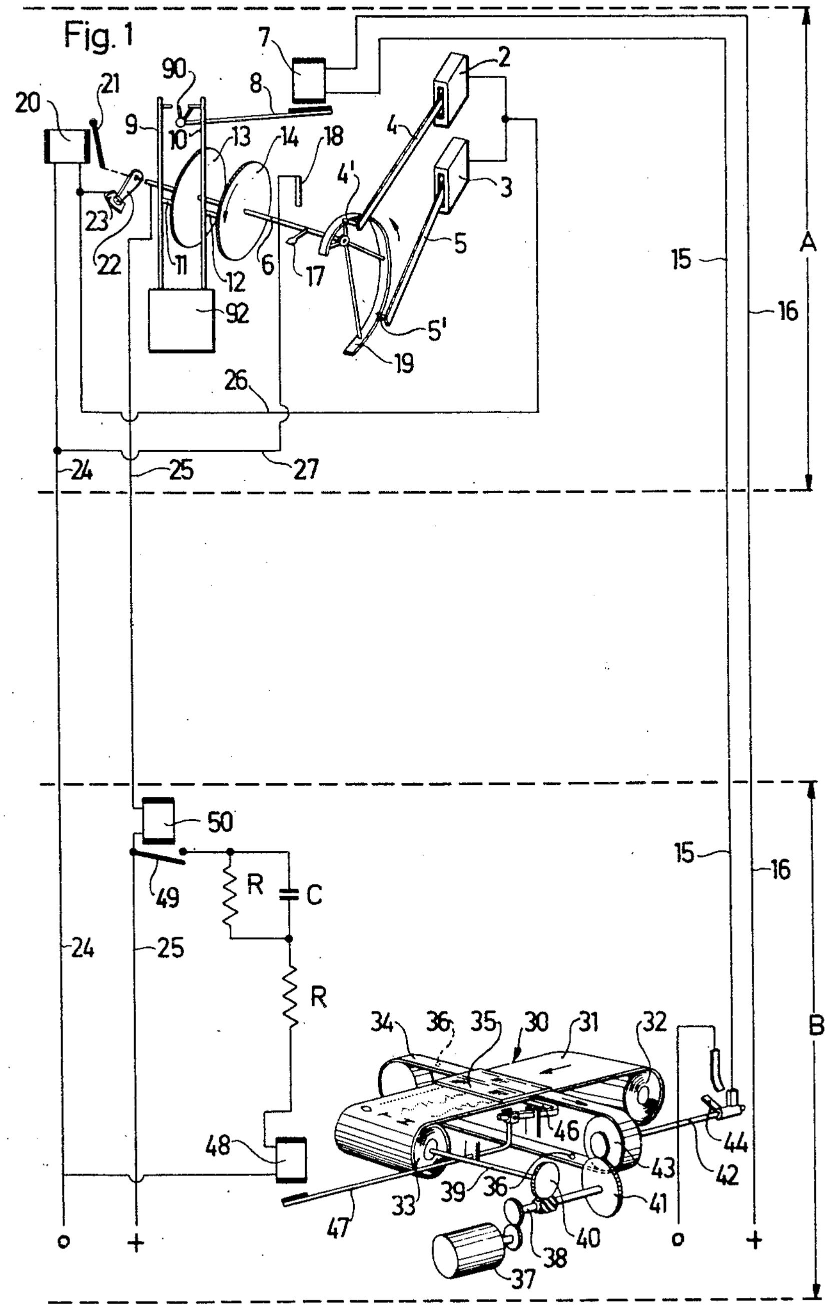
Fig. 1 is a circuit diagram of the first embodiment, illustrating schematically also some mechanical features of the invention.

In Fig. 1 the reference character A designates the section of the total system constituting the meteorological sonde which is intended to be carried by a balloon captive, while B designates the section comprising the meteorograph of a ground station.

In this embodiment of the invention the sonde includes two measuring instruments, viz. a bimetallic thermometer 2 and a hair hygrometer 3 together with indicating elements, each comprising an indicating arm 4 and 5, respectively, each movable in a vertical plane in correspondence with the result of the measuring operation and having a laterally projecting nib 4', 5', respectively. Moreover, the sonde includes the before-mentioned shaft 6 which is mounted both for rotation and for axial displacement. For continuously rotating said shaft with a constant speed, preferably one revolution per minute, the sonde includes an electromagnet 7 having an armature 8 for alternatingly lifting one of two dash-pot rods 9, 10 carrying pawls 11, 12, respectively, for alternatingly driving a respective one of two ratchet wheels 13, 14 held against rotation on said shaft. The electromagnet 7, 8 is energized by pulses supplied through the conductors 15, 16. The mechanism 7–14 will be described more detailed later on.

Attached to the shaft 6 is a contact arm 17 provided for closing a stationary time base contact 18 by engagement with the same, once for each revolution of the shaft. Attached to the shaft 6 is also a contact segment consisting of a spirally shaped strip 19 made as a plane spiral and extending from a point near the axis with a constant pitch over a substantial part of one convolution. The contact arm 17 may be made as a counter-weight for balancing the contact segment 19. The beginning of the spiral and the contact arm 17 correspond substantially with each other with respect to their angular positions. For axial displacement of the shaft 6 an electromagnet 20, 21 is provided, and when axially displaced the shaft is mechanically coupled with a contact arm 22 for making a sliding engagement with a stationary contact track 23, for a purpose to be described later on. The shaft 6 together with the elements 17, 19, 22 are electrically conducting, and also the elements 4, 4' and 5, 5' are electrically conducting. Reference numerals 24, 25, 26, 27 indicate conductors for establishing current paths over the elements 4, 5, 6, 17–23.

The conductors 15, 16, 24, 25 extend in a cable or similar transmission line to the ground station comprising the recorder or meteorograph 30. The meteorograph is provided with a record consisting of a waxed paper strip 31 fed from the roller 32 to the take-up roller 33 which preferably is driven by such speed that the record 31 is advanced ⅓ millimeter per minute. Transversely to the record extends an endless film strip 34, the upper part of said film strip running over the record but under a stationary glass plate 35. The film strip carries one or more nibs 36 facing downwards when running over the record. The means 34, 36 constitute the recording elements proper and the movement of a nib 36 over the record should be in synchronism with the rotation of the contact segment 19, the transversal extension of the record corresponding substantially to the linear extension of the spiral. With three nibs 36 the strip should perform 3 revolutions per minute.

The movements of the record 31 and the film strip 34 are derived from the motor 37 geared to a shaft 38 operating the axis 39 of the roller 33 over a worm gear 40. The shaft 38 is over a gearing 41 connected to the axis 42 of one roller 43 of the two end-rollers of the endless film strip 34. The axis 42 operates also a pulse transmitter 44 serving to supply pulses over the conductors 15, 16 to the electromagnet 7, thereby securing operation of the shaft 6 and rotation of the contact segment 19 in synchronism with the recording element 34, 36 of the meteorograph.

For forcing the record against the film strip and the glass plate 35 and thereby producing an impression or marking of the nib 36 in the record, a fall bail 46 is provided, extending under the entire width of the record and being linked to the armature 47 of an electromagnet 48 connected across the conductors 24, 25 over an RC-network, this connection being controlled by the armature 49 of an electromagnet 50 connected in the conductor 25.

Assuming now that the shaft 6 is beginning a revolution. Then, the contacts 17, 18 are closed for a moment, completing a circuit from plus-conductor over shaft 6, contacts 17, 18 and conductor 27 to zero-conductor 24. Thereby a short reference pulse is supplied through the winding of the magnet 50. When operating, the magnet 50 completes a circuit extending from conductor 25 over armature contact 49, the RC-network and the winding of the electromagnet 48 to the conductor 24, for energizing the magnet 48 by a corresponding short reference pulse. When energizing, the magnet 48 operates its armature 47, whereby the fall bail 46 is caused to strike the record forcing the same against the nib 36. Thus, by said pulse a reference marking is produced in the record. The RC-network serves to prevent double strokes of the armature 47 and to reduce the formation of arcs.

Then, upon further rotation the spirally shaped contact segment or strip 19 is contacted by the indicating element 4′ of the bimetallic thermometer 2, such contact engagement occurring on the outside of the spirally shaped strip 19. If the indicating element 4′ is in a position corresponding to a great deflection of the indicating arm 4, the indicating element 4′ will engage the strip 19 nearer to the centre than for a smaller deflection. In the moment of contact engagement a circuit is completed, extending from conductor 25 over magnet winding 50, shaft 6, strip 19, elements 4′, 4, conductor 26 and magnet winding 20 to conductor 24, whereby a short indicating pulse operates the magnet 50 for operating the magnet 48 for producing a marking in the record. This marking is obtained at a lateral distance from the reference marking, corresponding to the travel of the strip 19 until the point of contact with 4′ and thus corresponding to the result of the measuring operation of the bimetallic thermometer 2.

In operating, the magnet 20, 21 effects an axial displacement of the shaft 6, whereby the engagement of the elements 4′, 19 is immediately interrupted and the element 4′ is quite free to respond to the further measuring operation of the bimetallic thermometer 2. When performing said axial displacement the shaft is mechanically coupled with the contact arm 22 which then is moved along a contact track 23 for closing a holding circuit over the magnet winding 20 for a time interval allowing the strip 19 to rotate beyond the indicating element 4′ so that said element 4′ then is positioned inside of the strip 19. Then, the magnet 20 is allowed to release and the shaft 6 is axially returned by means of a spring (not illustrated in Fig. 1), the element 4′ still being free to respond to the further measuring operation.

Upon still further movement of the spirally shaped contact segment or strip 19, this strip is contacted by the indicating element 5′ of the hair hygrometer 3, such contact engagement also occurring at the outside of the spirally shaped strip 19. The operation will now be the same as for the indicating element 4′, a second indicating pulse being obtained for producing a second marking in the record. This marking is obtained at a still greater distance from the time reference marking, said distance corresponding to the result of the measuring operation of the hair hygrometer 3.

It is to be understood that by adjusting the two instruments 2 and 3 properly in relation to each other it is possible to secure that the indicating elements 4′ and 5′ engage in different zones on the strip 19 so that the two indicating markings will be spaced from each other across the record and may be read by means of associated scales provided on the glass plate 35 and calibrated to directly give the meteorological data corresponding thereto.

In the subsequent minute (revolution of the shaft 6) a new series of three markings are produced near to the first one, as the record moves very slowly. In Fig. 1, the reference character O indicates the reference line, while T and H indicate the curves of temperature and humidity, respectively. The reference markings will constitute a straight line in the longitudinal direction of the record independently of speed variations of the driving motor 37 on account of the joint control of the operation of recording element 34, 36 and the pulse transmitter 44 delivering the power for rotating the shaft 6 so that at such variations the relative speed variation of shaft 6 and element 34 will be of equal value.

Now, a structural embodiment of the sonde substantially incorporating the features explained in connection with Fig. 1 will be described in detail with reference to Figs. 2 to 7, inclusively.

The base plate 60 is a constituent of a frame formed by the posts 61, 62 and including an intermediate plate 63 as well as a top plate 64. Mounted directly on the base plate 60, near to its front side (see especially Fig. 2), is the bimetallic strip 65 of the bimetallic thermometer as well as the hair elements 66, 67, 68, 69 of the hygrometer. The bimetallic strip 65 is by a link 70 connected to the indicating arm 4 mounted on a horizontal pivot 71 in the frame and biased by a torsion spring (not shown). The nib 4′ has a resilient mount 73 on the indicating arm 4. The hair element 69 is connected to the indicating arm 5 mounted on a horizontal pivot 74 in the frame and biased by a torsion spring (not shown). Also the nib 5′ has a resilient mount 76 on the indicating arm 5. The elements 65, 70, 4 constitute the bimetallic thermometer 2 in Fig. 1, while the elements 66–69, 5 constitute the hair hygrometer 3 in said figure. This arrangement is well-known and needs no further description.

Figure 7:
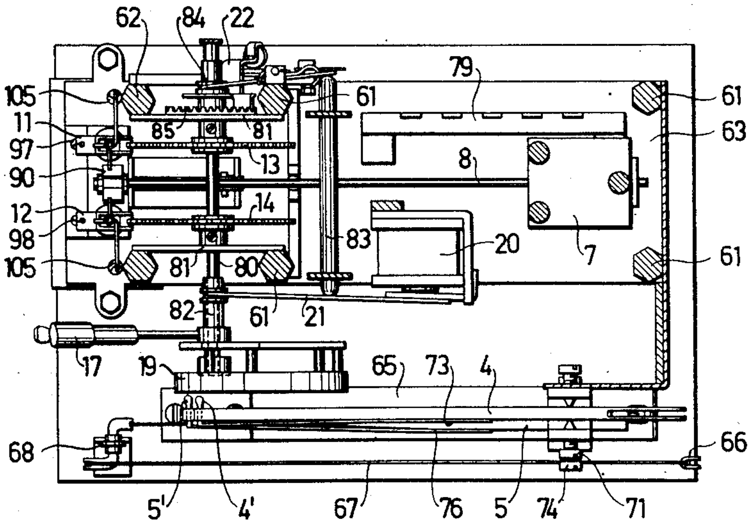
Fig. 7 is a horizontal cross-section corresponding to Fig. 6 but showing some movable parts in different positions.

In the frame is mounted a transversely extending shaft 80 which corresponds to the shaft 6 in Fig. 1. However, said shaft 80 is held against axial displacement and is mounted only for rotation in the frame, the bearings being supported by the brackets 81 (Fig. 6), while the contact segment or spirally shaped strip 19 is by means of its hub 82 slidable on said shaft but held against rotation on the same. Supported by the frame is the electromagnetic winding 20 and the associated armature 21, said armature operating horizontally and being coupled to the hub 82 for displacing the same axially when operated. Said axial movement is by the push rod 82 transferred to a lever 84 provided on the rear side (Fig. 5) and serving to couple the contact arm 22 with a driving wheel 85 attached to the shaft 80. The position of the elements 21, 83, 84, 22, 85 when displaced by the operation of the armature 21 is shown in Fig. 7. The contact arm 22 when in normal position is in engagement with the contact track 23 but insulated from the shaft 80, and is brought in electrical connection with the shaft when moved by the lever 84. A spring 86 is provided for returning the lever 84, the push rod 83, the armature 21 and the strip 19 when the magnet 20 releases after the contact arm 22 has passed over the contact track 23. The time-base contact means are in Figs. 2 and 3 indicated by the same reference numerals 17, 18 as in Fig. 1. Reference numeral 79 indicates a terminal block for making the electrical connections required.

Figure 2:
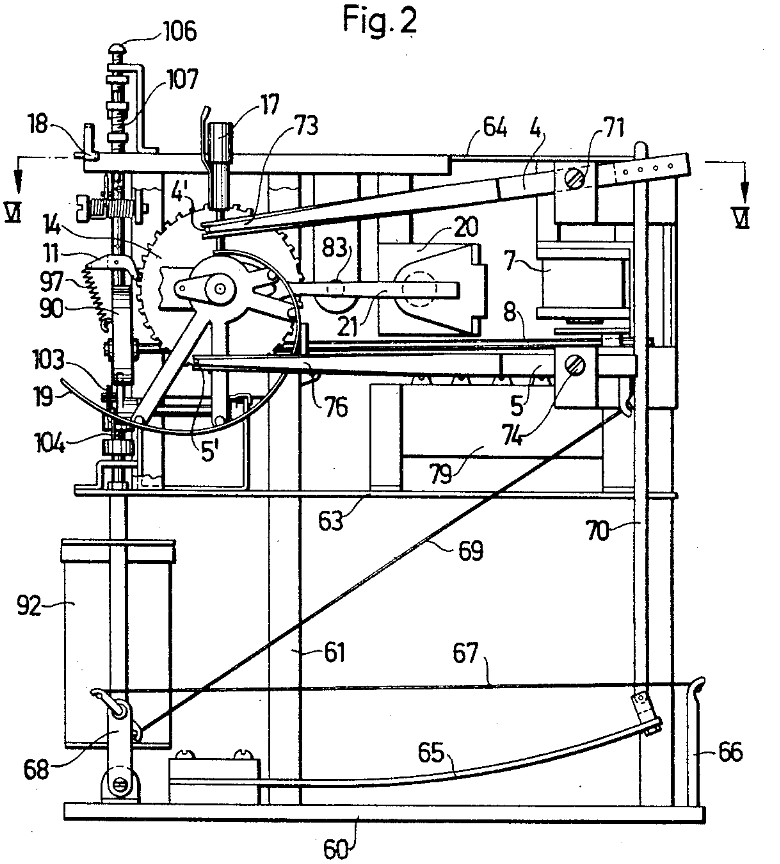
Fig. 2 is an elevation of the meteorological sonde according to the first embodiment, the apparatus being seen from the front side.
Figure 3:
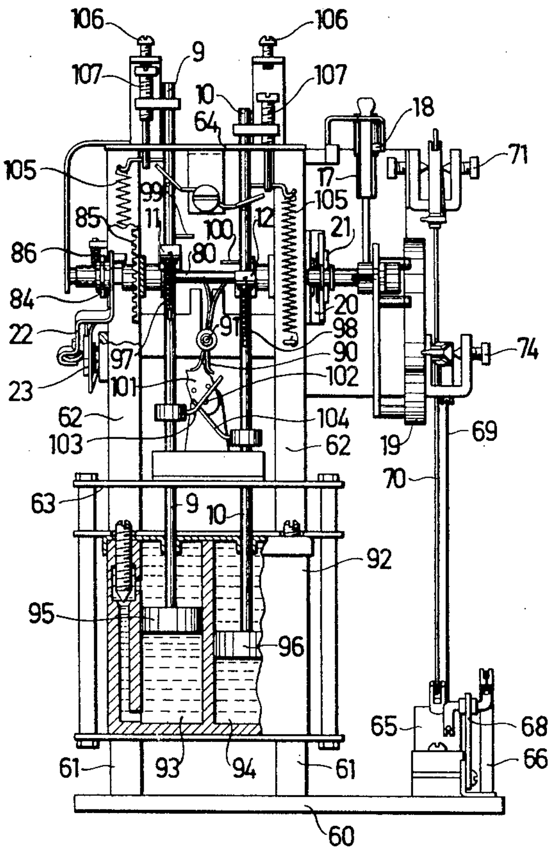
Fig. 3 is an elevation of the apparatus seen from the left-hand side in Fig. 2, as indicated by the arrow III.
Figure 4:
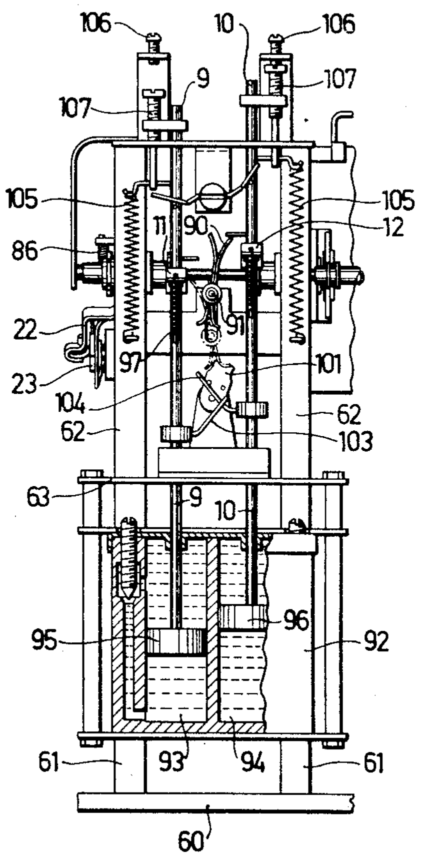
Fig. 4 is an elevation corresponding to Fig. 3 but showing some movable parts in different positions.
Figure 5:
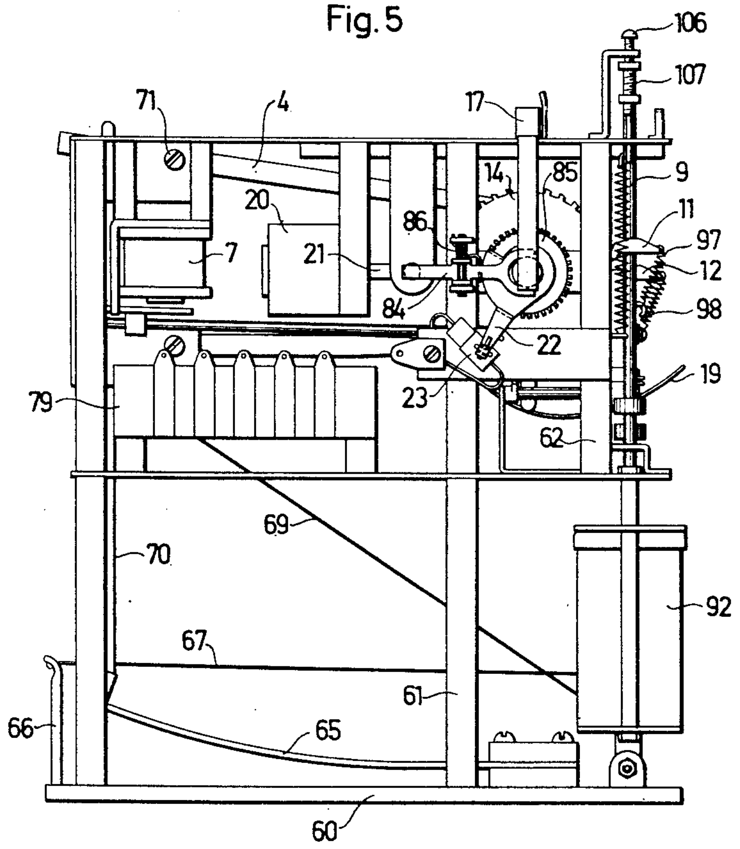
Fig. 5 is an elevation of the apparatus seen from the rear side, thus in a direction opposite to that in Fig. 2.
Figure 6:
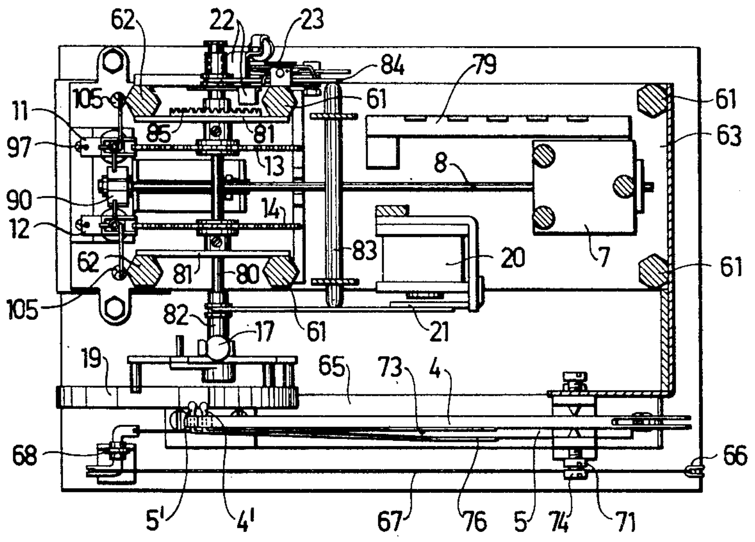
Fig. 6 is a horizontal cross-section taken substantially on the line VI—VI in Fig. 2.

In the frame is also mounted the electromagnetic winding 7 and the associated armature 80 (Figs. 2 and 6) which operates vertically and extends to the left-hand side in Fig. 2. On its left-hand terminal said armature carries a rocking member 90 the structure of which is shown in Figs. 3 and 4. Said member is mounted for rocking movement on a pivot 91 constituting an extension of the armature 8. Below the rocking member 90 is mounted a dash-pot device 92 comprising two cylinders 93, 94 together with pistons 95, 96 and restricted shunt channels for the damping oil or liquid, preferably a fluid "silicon," this device being of a well-known construction. The two piston rods or dash-pot rods 9, 10 extend upwards on opposite sides of the rocking member 90 and carry pawls 11, 12 (Figs. 2, 3 and 6), respectively, biased by springs 97, 98, respectively, for driving associated ratchet wheels 13, 14, respectively, securely mounted on the shaft 80.

The rocking member 90 comprises two upper arms which are adapted to alternatingly engage a projection 99, 100 on each rod 9, 10, respectively, for alternatingly lifting each rod in response to each operation of the armature 8, as well as two lower arms for being switched-over by a switch-over member 101 during the release movement of said armature. Said member 101 has two upper points and is mounted for rocking movement on a horizontal pivot 102 supported centrally with respect to the two rods 9, 10. Each rod carries also a projection or hook 103, 104, respectively, for controlling said switch-over member 101 by engagement with an associated projection on the same, when the dash-pot rod proper is lifted. The downward movement of the ends 9, 10 is effected by the springs 105. The upper limit of the travel of the rods 9, 10 is adjusted by the stationary stop screws 106, and the lower limit of said travel is adjusted by the stop screws 107, respectively, supported by the rods 9, 10.

In Fig. 3 the left-hand rod 9 has just been lifted and is going to start its travel downwards, damped by the dash-pot device. Just as the rod 9 reaches its lower end position the armature 8 is operated, lifting the member 90. In this lifting movement the right-hand upper arm of member 90 engages the projection 100 on the right-hand rod 10, lifting the same to the position shown in Fig. 4. During said lifting movement the hook 104 of rod 10 engages the left-hand projection of member 101 for switching-over the same to the position shown in Fig. 4. When the armature 8 releases, the right-hand lower arm of member 90 engages the left-hand point of member 100 and thereby the member 90 is switched-over to the position indicated by dotted lines in Fig. 4. Then the right-hand rod travels downwards and the member 90 is in position ready for lifting the left-hand rod 9 by the subsequent operation of said armature, whereby the left-hand rod 9 is lifted and the member 101 is switched-over to the position shown in Fig. 3.

The damping action of the dash-pot device is adjusted such that each rod 9, 10, respectively, will reach its lower end position just as the magnet is energized by a pulse. The alternating descending movements of the two rods 9, 10 follow exactly on each other and will effect a continuous rotation of the shaft 80 over the ratchet wheels 13, 14, this rotation being performed by a constant speed. The operation is reliable also under serious weather conditions and the entire sonde together with a cover (not shown) has a comparatively low weight (about 1000 grams).

In the embodiment as described above the joint control of the rotation of the shaft of the sonde and the movement of the recording element is obtained by providing the driving means of the recording element to operate also the pulse transmitter supplying pulses to the electromagnet of the sonde from which the rotation of said shaft is derived.

According to the second embodiment of the invention now to be described with reference to Figs. 8, 9 and 10, such joint control is realized by substituting a small single-phase synchronous motor for said electromagnet and the damped ratchet wheel mechanism, which synchronous motor is fed by single phase alternating current from the same source as supplying the driving motor of the recorder, no pulse transmitter being provided.

Figure 8:
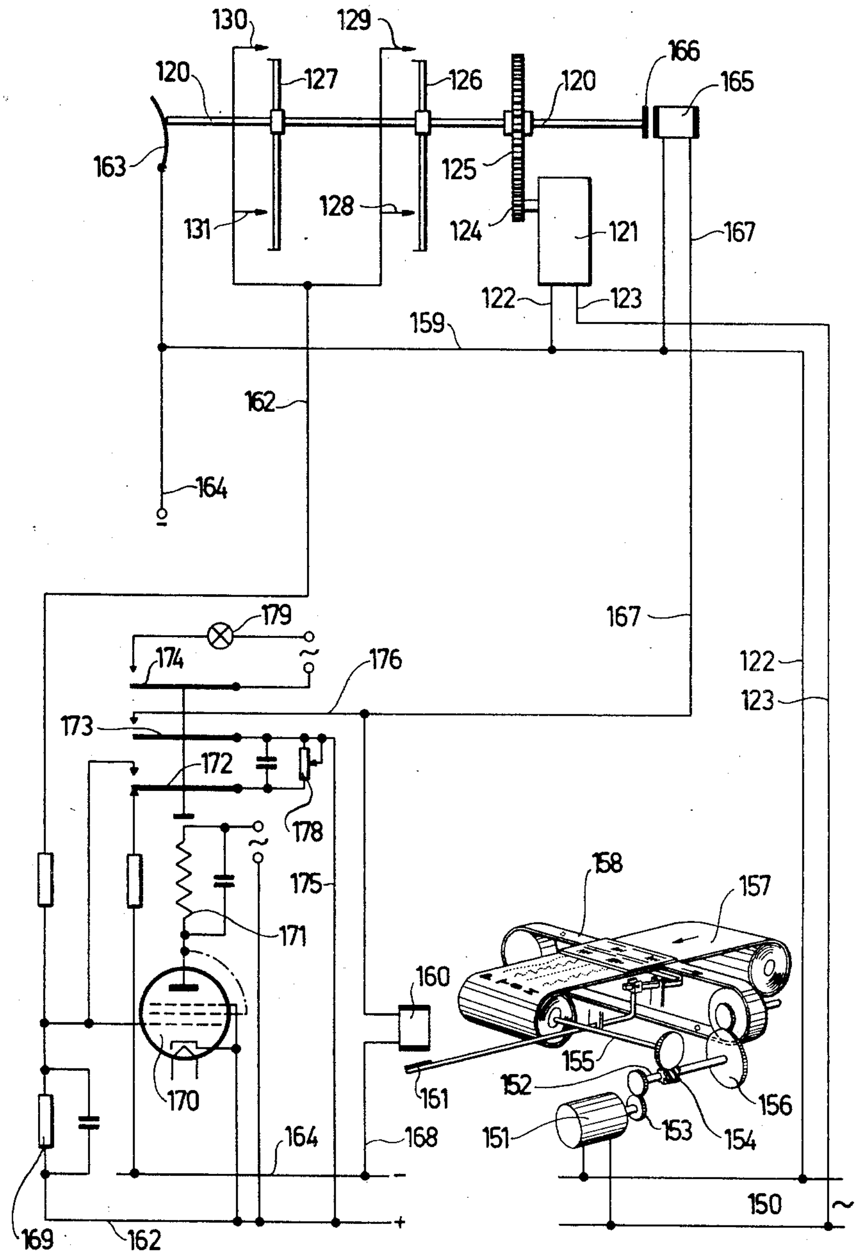
Fig. 8 is a circuit diagram of the second embodiment in its essential parts.

In Fig. 8, reference numeral 120 indicates the shaft of the sonde, which is to be considered as mounted for both rotary and axial movement. The synchronous motor 121 to which a single phase alternating current is supplied through the conductors 122, 123 imparts rotary movement to the shaft 120 over a gearing 124, 125, held against axial displacement, said shaft being axially movable in the hub of the gear 125. The shaft 120 could be provided with a separate contact segment for each measuring instrument, but in the embodiment illustrated in Fig. 8 the shaft carries two contact segments 126, 127 having a spirally shaped circumference and indicated only diagrammatically in Fig. 8. The contact segment 126 cooperates with the stationary reference contact element 128 and with the indicating element 129 of a hair hygrometer, while the contact segment 127 cooperates with the indicating element 130 of a bimetallic thermometer and with the indicating element 131 of an aneroid barometer.

In Fig. 9 the general mechanical arrangement of the essential elements of the sonde of the embodiment according to Fig. 8 is illustrated, the contact segments 126, 127 preferably being spirally shaped strips, extending over one half convolution (126) and one complete convolution (127), respectively. In Fig. 9, reference numeral 132 indicates an element of the frame of the sonde, supporting by suitable means the pivots 133, 134, 135 for the indicating arms 129, 130, 131, respectively, as well as anchoring means 136 for the stationary reference contact element 128, anchoring means 137 for the hair element 138 of the hygrometer, anchoring means 139 for the bimetallic strip 140 which is connected to the hub of the indicating arm 130 by a transmission element 141, and anchoring means 142 for the aneroid box 143 connected to the hub of the indicating arm 131 by a transmission element 144.

A more detailed disclosure of the structure of the sonde according to Fig. 8 is considered to be superfluous as such structure would correspond substantially with that already described with reference to Figs. 2 to 7, the only important difference being that the electromagnet 7, 8 in Figs. 2 to 7 together with the damped ratchet mechanism 9–14 and associated elements have been replaced by the synchronous motor 121 with gearing 124, 125. The entire weight of a sonde according to Fig. 8 is about 700 grams.

The recorder (Fig. 8) is substantially the same as in Fig. 1, but the pulse transmitter 44 is omitted and the conductors 122, 123 are connected the alternating current source 150, feeding the motor 151 which operates the same transmission elements 152, 153, 154, 155 as in Fig. 1. The record is indicated by 157 and the recording element proper has the reference numeral 158. Impressions are made in the record in response to the operation of the armature 161 of the electromagnet 160 when energized in response to reference and indicating pulses over an electronic relay circuit Said electronic relay circuit comprises an electronic tube having a control grid, preferably a pentode 170 which in normal condition is conducting as the control grid normally has zero potential or a slight positive potential over resistor 169 and conductor 162. Thus, the plate current normally flowing energizes the relay 171 which normally holds its contacts 172, 173, 174 in open position (lower position in the drawing). For each engagement of the strip 126 with reference contact element 128 or with indicating arm 129 and for each engagement of the strip 127 with indicating arm 130 or 131 a circuit is completed, extending from minus-conductor 164 over spring contact 163, shaft 120 and contact segment 126 or 127 to plus-conductor 162, thereby driving the control grid negative and blocking the plate current. Thus, the relay 171 releases and the contacts 172, 173, 174 are closed (moved upwards in the drawing). When contact 174 closes it completes a circuit illuminating a signal lamp 179 for the pulse interval. When contact 173 closes it completes a circuit from plus-conductor 162 over conductors 175, 176 and in part over conductor 168 to minus-conductor 164 for energizing the winding 160 and operating armature 161, in part over conductors 167, 159 to minus-conductor 164 for energizing the winding 165 for operating its armature 166 and displacing the shaft 120 to the right in Fig. 8, thereby interrupting the engagement of the contact strip 126 or 127 while the engagement of the contact spring 163 with the shaft 120 is maintained.

The negative potential on the control grid is not instantaneously removed at this moment because the contact 172 when closing connects the control grid to a delay circuit comprising the potentiometer 178 over which the control grid is gradually driven in the positive direction, for delaying the plate current. Thus, the windings 160, 165 remain energized for a short time interval dependent upon the setting of the potentiometer, until the contact segment or strip 126 or 127 has rotated beyond the nib of the indicating arm. Then, the pentode is rendered conductive and the relay 171 is energized for switching out the windings 160, 165 and the delay circuit 178.

According to Fig. 10 the record 157 is assumed to have the reference line O extending centrally while the curves T and H indicating temperature and humidity, respectively, extend on opposite sides of the reference line. The curve P indicating the pressure (altitude) is assumed to occupy any position over the entire width of the record.

This corresponds to the arrangement indicated in Fig. 9 according to which the indicate arm 131 of the aneroid box is adapted to cooperate with the contact segment 127 extending over one complete convolution and to engage the same at any point over the entire convolution. The indicating arm 130 of the bimetallic strip is adapted to engage the contact segment 127 during the first half revolution of the same, while the indicating arm 129 of the hair hygrometer is adapted to engage the other contact segment 126 during the second half revolution of the same. The reference contact 128 is adapted to engage the contact segment 126 just at the beginning of the spirally shaped path, viz. when the complete contact segment 127 has rotated one-half revolution.

A spiral extending over one-half convolution is illustrated in Fig. 11 and a spiral extending over one complete convolution is illustrated in Fig. 12. The time scale extends radially, covering 30 seconds in Fig. 11 and 60 seconds in Fig. 12, the spiral being assumed to perform one revolution per minute. Essential is that the spiral has a constant pitch.

It should be understood that the synchronous motor can be used also without the electronic circuit shown in Fig. 8, thus in a similar arrangement as in Fig. 1, and the direct current supplied to the conductors 24, 25 can be obtained from the alternating current source over a bridge rectifier as should be clear to anyone skilled in the art. Also in Fig. 8 the direct current required can be derived from the alternating current source over a rectifier, preferably via a transformer delivering also the alternating current required for the electronic circuit.

Moreover, the invention can be utilized in connection with radio sondes but is in no way restricted to the transmission of meteorological data inasmuch as the results of any measuring operation can be transmitted to any utilization circuit by means of the spirally shaped contact segments according to the invention.

What I claim is:

1. A system for transmitting the values of a measuring operation of at least one measuring instrument having a pointer with an electrical contact nib movable in dependence upon the measuring operation for indicating the result of the same, comprising a continuously rotatable contact segment having a circumference shaped as a plane spiral oriented at right angles to the axis of rotation and mounted for being contacted by the nib of said movable pointer at different points according to the position of said pointer for producing an indicating pulse, and means for transferring said indicating pulse to a utilization circuit.

2. A system for transmitting the values of a measuring operation of at least one measuring instrument having a pointer with an electrical contact nib movable in dependence upon the measuring operation for indicating the result of the same, comprising a continuously rotatable contact strip shaped as a plane spiral orientated at right angles to the axis of rotation and extending at most over one convolution, said contact strip mounted for being contacted by the nib of said movable pointer at different points according to the position of said pointer for producing an indicating pulse, and means for transferring said indicating pulse to a recorder.

3. A system for transmitting the values of a measuring operation of at least one measuring instrument having an electrical contact element movable in dependence upon the measuring operation for indicating the result of the same, comprising a continuously rotatable contact segment having a circumference shaped as a plane spiral orientated at right angles to the axis of rotation and mounted for being contacted by said movable indicating element at different points according to the position of said element for producing an indicating pulse, means for axially displacing said contact segment upon engagement with the indicating element for interrupting said engagement, means for axially returning said contact segment after a certain time interval, and means for transferring said indicating pulse to a recorder.

4. A system for transmitting the values of a measuring operation of at least one measuring instrument having an electrical contact element movable in dependence upon the measuring operation for indicating the result of the same, comprising a continuously rotatable contact strip shaped as a plane spiral orientated at right angles to the axis of rotation and extending at most over one convolution, said contact strip mounted for being contacted by said movable indicating element at different points according to the position of said element for producing an indicating pulse, means for axially displacing said contact strip upon engagement with the indicating element for interrupting said engagement, means for axially returning said contact strip after a predetermined time interval when the contact strip has moved beyond the contact element, and means for transferring said indicating pulse to a recorder.

5. A system for transmitting the values of a measuring operation of at least one measuring instrument having an electrical contact element movable in dependence upon the measuring operation for indicating the result of the same, comprising a continuously rotatable shaft, a contact strip shaped as a plane spiral extending at most over one convolution, said contact strip being supported by said shaft in a plane at right angles to the same and mounted for being contacted by said movable indicating element at different points according to the position of said element for producing an indicating pulse, an electrical time base contact provided for being operated in dependence upon the rotation of said shaft for producing one reference pulse for each revolution of said shaft, means for axially displacing said contact strip upon engagement with the indicating element for interrupting said engagement, means for axially returning said contact strip after a predetermined time interval when the contact strip has moved beyond the indicating element, and means for transferring said indicating pulse and said reference pulse to a recorder.

6. A system for transmitting the values of a measuring operation of at least one meteorological measuring instrument having an electrical contact element movable in dependence upon the measuring operation for indicating the result of the same, to a recorder having a record strip and a recording element movable across the same as well as an electromagnet for producing an impression of said recording element upon said record strip, comprising a continuously rotatable shaft, a contact strip shaped as a plane spiral extending at most over one convolution, said contact strip being supported by said shaft in a plane at right angles to the same and mounted for being contacted by said movable indicating element at different points according to the position of said element for producing an indicating pulse, an electrical time base contact provided for being operated in dependence upon the rotation of said shaft for producing one reference pulse for each revolution of said shaft, means for axially displacing said contact strip upon engagement with the indicating element for interrupting said engagement, means for axially returning said contact strip after a predetermined time interval when the contact strip has moved beyond the indicating element, means for transferring said indicating pulse and said reference pulse to the recording magnet, and means for joint control of the rotation of said shaft and the movement of said recording element across the record strip.

7. A system for transmitting the values of a measuring operation of at least one meteorological measuring instrument having an electrical contact element movable in dependence upon the measuring operation for indicating the result of the same, to a recorder having a record strip and a recording element movable across the same as well as an electromagnet for producing an impression of said recording element upon said record strip, comprising a continuously rotatable shaft, a contact strip shaped as a plane spiral extending at most over one convolution, said contact strip being supported by said shaft in a plane at right angles to the same and mounted for being contacted by said movable indicating element at different points according to the position of said element for producing an indicating pulse, an electrical time base contact provided for being operated in dependence upon the rotation of said shaft for producing one reference pulse for each revolution of said shaft, electromagnetic means connected in circuit with the contact strip and the indicating element for operating the electromagnet of the recorder for causing the recording element to produce an impression in the record strip, electromagnetic means for axially displacing said contact strip upon engagement with the indicating element for interrupting said engagement, means for holding the last-mentioned electromagnetic means operated for a predetermined time interval until the contact strip has rotated beyond the indicating element, means for axially returning said contact strip after said predetermined interval, and means for joint control of the rotation of said shaft and the movement of the recording element across the record strip.

8. A transmission system comprising a meteorological sonde including at least one meteorological instrument having an electrical contact element movable in dependence upon the measuring operation for indicating the result of the same, a recorder having a record strip and a recording element movable across the same as well as an electromagnet for producing an impression of said recording element upon said record strip, and a transmission line interconnecting the sonde and the recorder, wherein the sonde comprises a continuously rotatable shaft, a contact strip shaped as a plane spiral extending at most over one convolution, said contact strip being supported by said shaft in a plane at right angles to the same and mounted for being contacted by said movable indicating element at different points according to the position of said element for producing an indicating pulse, an electrical time base contact provided for being operated in dependence upon the rotation of said shaft for producing one reference pulse for each revolution of said shaft, electromagnetic means connected in circuit with the contact strip and the indicating element for operating the electromagnet of the recorder for causing the recording element to produce an impression in the record strip, electromagnetic means for axially displacing said contact strip upon engagement with the indicating element for interrupting said engagement, means for holding the last-mentioned electromagnetic means operated for a predetermined time interval until the contact strip has rotated beyond the indicating element, means for axially returning said contact strip after said predetermined interval, and means for joint control of the rotation of said shaft and the movement of the recording element across the record strip.

9. A system as claimed in claim 7, wherein said holding means comprise a contact member provided for being coupled to the rotating shaft upon axial displacement of the contact strip and sliding over a contact track closing a holding circuit of the axially displacing electromagnetic means, until the contact strip has rotated beyond its contacting element.

10. A system as claimed in claim 7, wherein said holding means comprise a grid-controlled electronic tube for actuating an electromagnetic relay controlling both axially displacing magnet and recording magnet, a delay circuit being provided for gradually changing the potential of the control grid to reverse the condition of said relay upon elapse of a predetermined time interval.

11. A system as claimed in claim 7, comprising an electromagnet for alternatingly lifting one of two dashpot rods which carry pawls for alternatingly driving an associated one of two ratchet wheels held against rotation on said shaft, said electromagnet being energized by pulses supplied from a pulse transmitter operated in dependence upon the movement of the recording element across the record, for operating said shaft in synchronism with the recording element.

12. A system as claimed in claim 7, comprising a single-phase synchronous motor for rotating said shaft, said motor being connected to the same source of voltage as a driving motor for moving the recording element over the record.

13. A system as claimed in claim 7, wherein said time base contact is provided for being closed by engagement with a separate contact arm attached to said shaft.

14. A system as claimed in claim 7, wherein said time base contact is provided for being closed by engagement with the contact strip.

15. A system as claimed in claim 7, comprising several contact strips on said shaft, provided for being engaged by several indicating elements associated with corresponding measuring instruments.

References Cited in the file of this patent

UNITED STATES PATENTS

| | | |
|---|---|---|
| 2,214,159 | Bristol | Sept. 10, 1940 |
| 2,232,589 | Chappell et al. | Feb. 18, 1941 |
| 2,333,083 | Dueringer | Feb. 18, 1941 |
| 2,453,686 | Hoffman | Nov. 9, 1948 |
| 2,623,112 | Adelson | Dec. 23, 1952 |